UNITED STATES PATENT OFFICE.

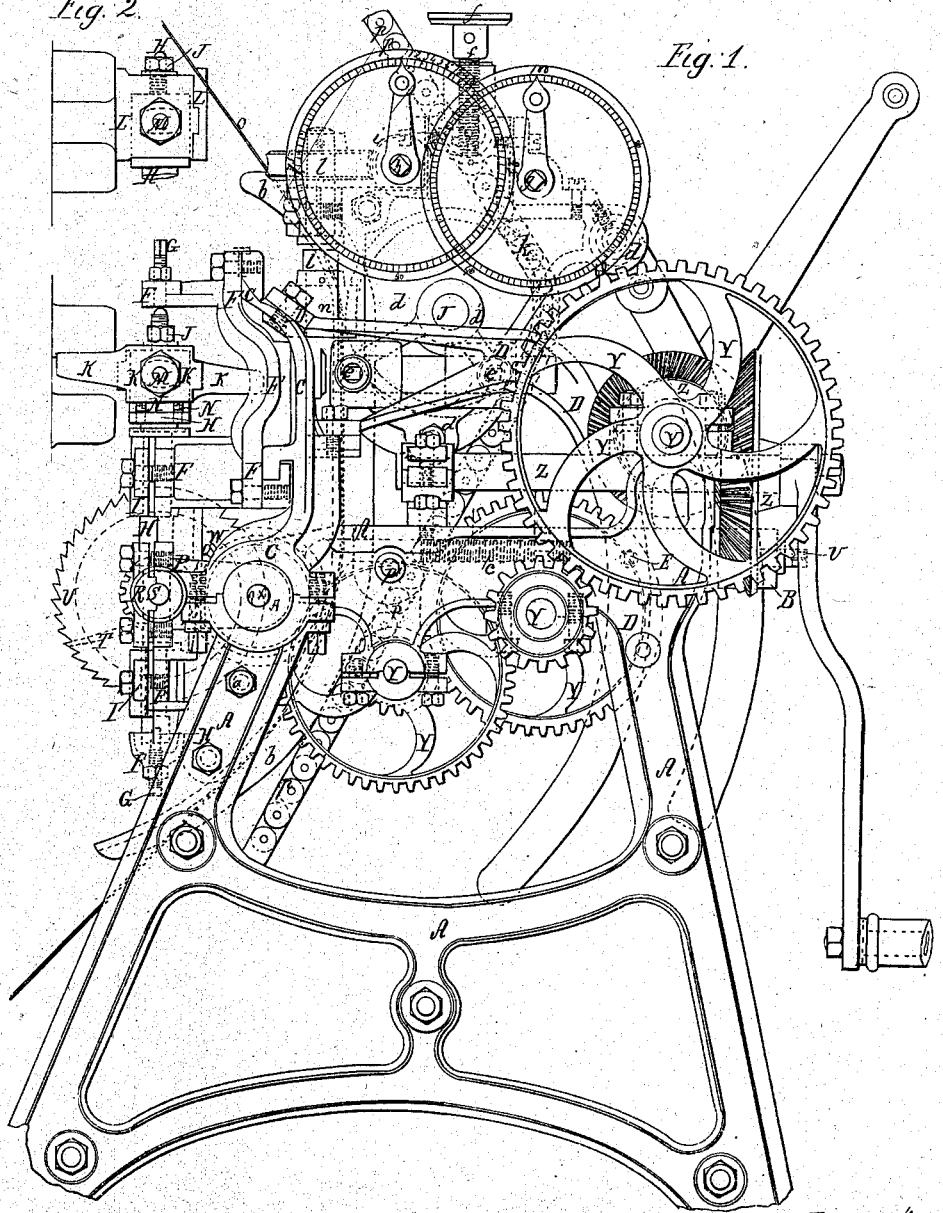

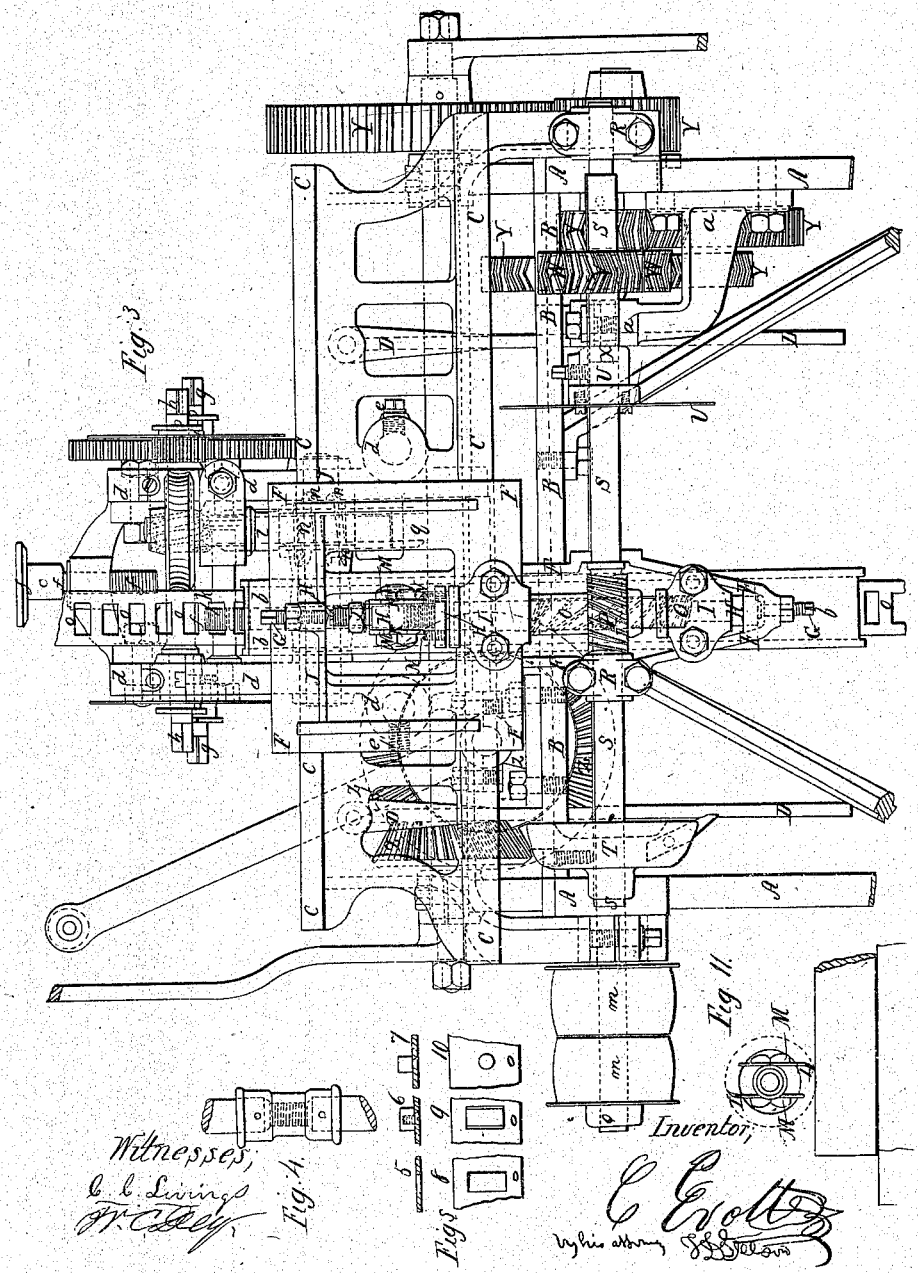

CHARLES EVOTTE, OF PARIS, FRANCE.

Letters Patent No. 87,766, dated March 16, 1869.

IMPROVEMENT IN GEAR-CUTTER.

The Schedule referred to in these Letters Patent and making part of the same.

*To all whom it may concern:*

Be it known that I, CHARLES EVOTTE, of Nos. 31 and 33 rue Riquet, Paris, in the Empire of France, practical engineer, have invented "a portable machine for turning, dividing, and shaping wooden cogs, upon wheels of from one foot and three-quarters in diameter up to any diameter, however limited for space may be the workshops or manufactories in which such wheels require to be supplied with new cogs;" and I do hereby declare that the following is a full and exact description of the principle or character which distinguishes this machine from any apparatus hitherto applied to such purposes, also of the manner of making such machine, and of certain modifications thereof, reference being had to the accompanying sheets of drawing, and to the figures and letters of reference marked thereon.

The operation of turning, dividing, and shaping wooden cogs was originally effected by hand. The wheel being fitted with its cogs, in a rough state, a workman had first to cut the cogs to the desired width; then to divide the wheel and compass the shape of the cogs; all this by hand-work; and finally, he had to cut them to shape by means of hand-tools.

A machine was subsequently invented for dividing and shaping cogs upon wheels not exceeding nine or ten feet in diameter. In using this machine, it is necessary that the wheel be first mounted on a lathe, in order to turn the sides and periphery, this preparatory work, therefore, necessitating the removal of the wheel from its shaft. Further, the dividing-machine is limited in diameter, and certain wheels must, therefore, still be shaped by hand, which is a great inconvenience, for, when the cogs of a large driving-wheel are broken or worn out, as frequently happens in manufactories, the work must be done on the spot, and the job occupies considerable time. For instance, four men will be employed four days in turning, dividing, and shaping the cogs of a driving-wheel having four hundred cogs of three-fourths of a foot in width. The result is, a loss of four days' working, and a cost of sixteen days journeyman's work.

To avoid this, I have invented a portable machine, which may be driven by hand-crank, by steam, or by any available power, and which will effect mechanically, with precision and rapidity, in less than one day, the work hitherto requiring the time and labor above stated, the said machine performing its task either in workshops or in manufactories, and turning, dividing, and shaping cogs upon wheels of any size, from one foot and three-fourths in diameter, upward.

The wheel to be cut is not mounted upon, or in any way attached to my machine, except by means hereafter described.

The machine being firmly placed, and the wheel being firmly held, independent of each other, in the proper relative positions, the cutters of the machine remove the wood from the cogs properly, and trim the several teeth, and make the proper spaces between the teeth. I turn the wheel to the proper extent, in cutting the spaces between the teeth, by means of an inelastic, but sufficiently flexible belt, or chain, which is held tightly upon the points of the teeth; after the manner of a belt, and, passing through the machine, is moved along to exactly the right extent after each operation, thus turning the wheel an equal amount, and dividing it with mathematical exactness, whatever be the size of the wheel.

Figure 1 is an end view of the machine adjusted for cutting the acting faces of the teeth of a large wheel, of which latter only two teeth are shown.

Figure 2 represents the same teeth, with the portion of the machine adjacent, adjusted and prepared for the preliminary operation of cutting the points of the teeth. This prepares the surface on which the belt or chain is to rest for the subsequent treatment.

Figure 3 is a face view of the machine.

Figure 4 represents a coupling employed in driving it.

Figures 5, 6, and 7, represent sections of different modes of constructing the inelastic belt, and Figures 8, 9, and 10, represent face views of the same modifications.

Figure 11 is a plan view of the cutters and of a tooth in the act of finishing the point or periphery, as above explained.

It will be explained further on, that when the shaft S and its adjuncts are in the machine, the shaft H and its adjuncts are removed. Both are represented here in their positions for use, in order to avoid multiplication of the figures.

On the accompanying sheets of drawing—

A indicates right and left cast-iron frames.

B, horizontal stay-frame.

C, oscillating frame, fitted on two studs cast with the frames A.

D, arched, or bent pieces, regulating the inclination of the oscillating frame by means of screws E.

E, screws pressing the arched pieces D.

F, sliding frame, on which are fitted the shafts carrying the cutters, or blades, K L.

G, steel screw used as a centre-spindle for the vertical shaft H.

H, vertical shaft fitted with the blades K L.

I, bearing-block for the shaft H.

J, screw-nut pressing upon the top of the blades K L.

K, blades for shaping cogs.

L, blades for turning the top ends of cogs to the required periphery.

M, bolt for screwing the blades tight upon the boss of the shaft H.

N, screws, to regulate the height of the blades K L on the boss of the shaft.

O, toothed wheel gearing with the pinion P.

P, screw-pinion gearing with O.

Q, grooved shaft carrying the toothed wheel O.

R, bearings of the shaft S.

S, shaft carrying the blades T and saws U.

T, cutting-blades, which cut the sides of cogs.

U, saw-blades for cutting also sides of cogs.

V, pinion set on shaft S, when the blades T and saws U are to be used.

W, toothed wheel carried by the shaft X, and actuated by the set of wheels Y.

X, shaft put in the place of Q when the blade-holders T are fitted, and carrying the wheel W.

Y, gearing of the machine.

Z, bevel-wheels.

a, bearing-block set up when the blades T and saws U are to be used, and receiving the shaft X.

b, curved piece receiving the band or ribbon o, and intended to stretch it.

c, jointed screw, which draws back the curved piece b.

d, right and left frame of the dividing-apparatus.

e, screws fastening the dividing-apparatus on the slides.

f, screw-jack, or buttress, to prevent vibration.

g, hand-crank, with dial, and hands, and toothed wheel, gearing with pinion h.

i, screw actuating the wheel fitted on the shaft l.

j, shaft carrying screw-gear and wheel actuating the band or chain.

k, wheel actuating the band or chain.

l, vertical shaft.

m, driving-pulley to be used when steam-power is employed.

n, pinion set on the shaft l, and actuated by the screw q.

o, endless band placed on the periphery of the wheel.

p, endless chain used for the same purpose as the steel band.

q, screw on the shaft j, actuated by pinion n.

This machine is composed of two vertical cast-iron frames, A, firmly united by a horizontal stay-frame, B, which also receives, in conjunction with the frames A, the various bearing-blocks of the gearing.

Another frame, C, oscillating on two studs cast with the frames A, permits the inclination of the vertical blade-shaft H toward the axis of the cog-wheel which is to be operated upon.

This inclination is regulated by two arched, or bent pieces, D, fitted on frame C, and sliding through openings made in frame B, where they are fastened by the adjusting-screws E.

A sliding frame, F, of complicated form, carries the blade-shafts for facing the sides of, or for turning or shaping the cogs.

This work is performed in three operations, which are hereinafter explained.

The sliding frame F bears, at its upper part, a steel screw, G, used as a centre-spindle for the blade-shaft H, and at the lower part there is a brass socket-bearing, in which the lower end of the shaft revolves on a steel spindle.

This shaft is mounted on the slide-frame by two upper and lower bearing-blocks I.

It has, at its uppermost part, a boss with two flat edges, surmounted by a screw-tapped part, with steel spindle and nut J, the latter securing the blades on the top.

Each of these flat parts receives the blades K L, for shaping or for turning the ends of cogs. They are fitted with a round-headed bolt, M.

The bolt-eye of the said blades is oval, so as to permit shifting them up or down, or bringing them forward or backward; in a word, to regulate their position. They are regulated, also, by four adjusting-screws N, securing them in position, and preventing any departure from the horizontal or inclined position in which they are fixed.

The blade-holder H is actuated by a helical or screw-pinion, P, driven by a wheel of the same description, O, set on a grooved shaft, Q, and following the pinion horizontally in all the positions of the sliding carriage.

The wheel O is actuated by gearing Y, set in motion by hand-cranks.

The sliding frame F carries a bearing-block, R, which receives the shaft S, fitted with the blade-holders T and saw-holders U, for facing the sides of cogs; this shaft being only set in the machine when the shaft H is removed.

The blade and saw-holders T U, and shaft S, are grooved, so that they may slide, and their position be varied, according to the width the cogs are to be cut. They are fastened in their proper place by adjusting-screws.

The shaft is actuated by a pinion, V, fitted on the shaft S, and driven by a wheel, W, set on shaft X.

This latter is put in place of the shaft Q, when the blade and saw-holders are set in the machine.

The bearing-block a is then bolted on the right frame A, and the shaft X inserted.

On each side of the back part of the frames are arranged three hand-cranks, actuating the gearing Y. This number and arrangement of cranks is adopted in order that the machine may be worked from any side, in case one or more sides should be encumbered by pillars, walls, fixed beams, or other obstacles.

The driving-gear Z may be shifted horizontally into various places on the frame B, for the same purpose.

The machine may also be driven by any power, by means of a belt on the pulleys m.

The dividing-apparatus is set up as follows:

It is composed of two right and left frames d, tied to the oscillating frame C by means of two rods screwed in the latter, and serving as sliding supports.

It is fastened by four adjusting-screws e.

It is also fitted with a bent forked piece, for the purpose of fixing it in different positions, as is done for the oscillating frame C, every inclination of which it follows.

A small cast-iron cross-piece, with screw-jack f, keeps the machine steady, by pressing in any direction upon fixed beams or other fixed points.

This dividing-apparatus is actuated as follows:

A small hand-crank, fitted on the axle of the wheel g, drives this latter, which actuates a pinion, h.

On the axle of this pinion h is fitted a helical screw-pinion, i, gearing with a wheel of the same description, fixed on shaft l.

On the vertical shaft l, at its lower part, there is also fitted a helical screw-pinion, n, driving a horizontal shaft, j.

This shaft j carries the cam-wheel k, which gears with the chain p or the band or ribbon o, when either of them is placed in the machine, and communicates a revolving motion to the wheel which is to be cogged.

When the chain p is used, it is placed (as shown Sheet I of the drawings) on the cam-wheel k, the curved piece being used only as a lever to stretch the chain, to effect which the tension-screw c is screwed up. The curved piece b is brought on the toothed driving-wheel of the chain, whilst the four screws of the indicator, or meter, are loosened, so that the apparatus may slide, and stretch the chain.

When the chain is well stretched, the screws e are screwed up, and the curved piece, being no longer of any use, may be loosened.

On the two axles g h are set dials, the hands of which are repeated on both sides of the apparatus, in case any obstruction should compel the operator to place himself on the opposite side of the machine.

The dial fitted on g, registers with accelerated motion. It brings the wheel forward five millimetres per circumvolution of the hand.

The dial fitted on h gives an advancement of one millimetre, and is divided into one hundred parts, equal to one ten-thousandth of a metre in decimal measure.

The dial is also employed for accelerating motion in turning the sides of cogs, in which case the hand-crank is fitted on axle $g$, instead of $h$.

WORKING OF THE MACHINE.

First Operation—Facing or Turning the Top Ends of Cogs.

Presuming I have to turn, divide, and shape a cog-wheel already cogged with rough cogs, I bring the dividing-apparatus near the wheel, and place it so that it faces the top end of the cogs. I incline the oscillating frame C, so that it is at a tangent to the circumference of the wheel. The oscillating frame is fastened by screws E, pressing on the bent forked pieces D. I then direct the screw-jack, or buttress $f$, of the dividing-apparatus, toward a fixed spot, and when firmly set, so as to perfectly consolidate and steady the machine, this latter being brought level with the wheel, may be firmly secured by screw-bolts, on the ground or flooring, or on pieces of timber, according to the nature of the locality in which the machine is placed.

When the apparatus cannot be fixed on the ground, it may be fastened, by means of several bolt-eyes provided for that purpose, on each side of the frame.

When the machine is firmly secured, I fix the cutting-tools, or blades L, by which the ends of the cogs are to be cut, on the shaft H, (see Fig. No. 2, sheet 1,) and I then set the wheel O on its axle Q. I then pass the steel band or chain, on the circumference of the wheel, over the cogs, and inside of the dividing-apparatus, over the cam-wheel $k$. I then stretch the band $o$ or chain $p$ by means of the curved piece $b$, which is drawn tight by a forked screw, $c$.

When the dividing-apparatus is near enough to the curved piece $b$, I screw up the four screws $e$, thus fixing the dividing-apparatus in its proper position.

The machine is then set in motion.

While turning the handle $g$ of the dividing-apparatus until the first cog comes in front of the blade, (as in fig. 2, Sheet No. 1,) I push the sliding frame forward, and the blades L cut the top end of the cog. I then draw back the sliding frame to its first position, and by turning the dividing-handle, pass to the next cog, and so on to the last.

Second Operation—Division and Shaping of Cogs.

For this operation, the blades L must be changed, and the blades K be substituted. Nails are to be driven on a few cogs, so as to prevent the band or chain slipping.

Supposing the circumference of the wheel to measure 1871.795 centimetres, or divisions of the band or chain, and the number of cogs to be three hundred and ninety-eight, the pitch, or space, from the centre of one tooth to the centre of the next, measured on the circumference of the wheel or points of the teeth, will be 47.03 millimetres. Having brought down the first space in front of the blade, (see Sheet No. 1,) I put the machine in motion, pushing, at the same time, the sliding frame C. The two blades then shape the two faces of a middle space between two cogs. I bring back the sliding frame, and the machine continuing to revolve, I make nine revolutions with the dividing-handle fixed on the axle $g$, which produces forty-five millimetres of advancement on the chain or band, and consequently on the circumference of the cog-wheel. I make two other revolutions with the hand $h$ of the other dial, and three divisions more. The advancement on this dial being one millimetre for each revolution, it follows that I obtain two millimetres $+\frac{3}{100} = 45 + 2\frac{3}{100} = 47\frac{3}{100}$ m, after which the next cog, being brought facing the blade, I again push the sliding frame and shape the cog.

This operation is repeated for each cog, to the last, this varying one-hundredth of a millimetre, which may be divided among several cogs, if an absolutely accurate division be required.

The dials of the dividing-apparatus are repeated on both sides of the machine, so that the operator may be able to govern the quadrant-dial hands, even should one side of the machine be unapproachable.

Third Operation—Turning the Ends of the Cogs or Facing Both Sides of the Wheel.

For this purpose, I remove the axles Q and H, fix the block $a$ with its small axle X, and then put on the axle S, carrying the blades T U. On this axle are fastened either the blades T or the saw U, which are set at a distance from each other regulated by the width of the cogs.

I then put the machine in motion, at the same time turning the dividing-handle placed on the axle $g$ of the indicator, or meter, which accelerates the rotation of the wheel, and brings each cog either to the saw U or to the blade T.

By putting together the blades K and L, the wheel may be turned on its periphery, divided, and shaped, in a single operation, and the time required to perfect the work be reduced one-third.

An endless chain is used only for very large wheels, which will only rotate under great power. In all other cases the steel band is preferable, as being more pliable, light, and rigid.

The axle Z of the bevel-gearing may be removed, as aforesaid, and set up in various positions. For that purpose, lugs with bolt-eyes are arranged to receive the two plumber-blocks carrying the axle, should any impediment necessitate their use.

In case there should not be sufficient space for working with cranks, shafts of various lengths could be joined together by a coupling-box, (as shown fig. 2, Sheet II,) and the machine be driven from any distance.

What I claim as my invention, and desire to secure by Letters Patent, is—

1. The shaft S, and cutting-devices T and U, mounted in adjustable positions thereon, the shaft being carried in the frame-work, and receiving motion, substantially in the manner and for the purposes herein set forth.

2. The employment of the non-elastic rack, or belt $o$, moved at intervals to an adjustable extent, and adapted to move the wheel to be cut, to mathematically-determined extents, as and for the purposes herein set forth.

C. EVOTTE.

Witnesses:
 DWIGHT MORRIS,
 JOHN S. HUNT.